TESTING AND HANDLING OF MAGNETIC MATERIALS

Filed March 25, 1953 5 Sheets-Sheet 1

INVENTORS
JAN A. RAJCHMAN
RAYMOND STUART-WILLIAMS
AND JOSEPH L. WALENTINE
BY Samuel Lindenberg
ATTORNEY June 25, 1957 J. A. RAJCHMAN ET AL 2,796,986

TESTING AND HANDLING OF MAGNETIC MATERIALS

Filed March 25, 1953 5 Sheets-Sheet 2

INVENTORS
JAN A. RAJCHMAN
RAYMOND STUART-WILLIAMS
AND JOSEPH L. WALENTINE

BY Samuel Lindenberg
ATTORNEY

TESTING AND HANDLING OF MAGNETIC MATERIALS

Filed March 25, 1953 5 Sheets-Sheet 3

INVENTORS
JAN A. RAJCHMAN
RAYMOND STUART-WILLIAMS
AND JOSEPH L. WALENTINE
BY Samuel Lindenberg
ATTORNEY

TESTING AND HANDLING OF MAGNETIC MATERIALS

Filed March 25, 1953 5 Sheets-Sheet 4

INVENTORS
JAN A. RAJCHMAN
RAYMOND STUART-WILLIAMS
AND JOSEPH L. WALENTINE
BY Samuel Lindenberg
ATTORNEY

TESTING AND HANDLING OF MAGNETIC MATERIALS

Filed March 25, 1953 5 Sheets-Sheet 5

INVENTORS
JAN A. RAJCHMAN
RAYMOND STUART-WILLIAMS
AND JOSEPH L. WALENTINE
BY Samuel Lindenberg
ATTORNEY 2,796,986

TESTING AND HANDLING OF MAGNETIC MATERIALS

Jan A. Rajchman and Raymond Stuart-Williams, Princeton, and Joseph L. Walentine, Trenton, N. J., assignors to Radio Corporation of America, a corporation of Delaware Application March 25, 1953, Serial No. 344,646

28 Claims. (Cl. 209—72)

This invention relates to the handling, testing and sorting of magnetic cores, and more particularly, to apparatus for automatically performing these operations.

Information storage systems using magnetic cores as the basic elements have been developed for use in large-scale electronic computers. Magnetic-core storage systems are described in "Static Magnetic Matrix Memory and Switching Circuits," by J. A. Rajchman, RCA Review, June 1952; "Digital Information Storage Using Magnetic Cores," by J. W. Forrester, Journal of Applied Physics, January 1951; and "A Coincident-Current Magnetic Memory Cell," by W. N. Papian, Proc. of the I. R. E., April 1952. These systems use a multitude of magnetic cores of uniform magnetic characteristics.

The magnetic cores may be made of ferrite or ferrospinel materials molded in toroidal or similar forms. The cores are molded from powdery materials in an automatic machine, and then are subjected to heat treatment. In this process, non-uniformity of the cores is likely to occur due to variations or imperfections in the molding machines, in the heat treatment, and in the compound used. It would be difficult and expensive to control the manufacture of the cores sufficiently to insure uniformity of the cores to the degree needed in the magnetic memory and other devices. It has been found that uniformity may be achieved more reliably and less expensively by testing the cores and screening out those that do not meet the standards set. This is also true where the magnetic cores are made by winding metallic tape on ceramic bobbins.

It has been desirable to use magnetic cores of very small dimensions: The outside diameter is of the order of one-sixteenth of an inch, and the inside diameter one-thirty-second of an inch. Due to the special problems of handling such small cores, such as electrical coupling difficulties, new testing systems were devised to measure the characteristics of the cores. A manual system for testing is described in the patent application to Rajchman et al., Serial No. 346,892, filed concurrently herewith on March 25, 1953, U. S. Patent 2,760,153. In this system, the cores are threaded manually on a metallic pin. Energizing current pulses are applied to the pin, and a voltage pickup coil is completed through the pin to provide representative induced voltages that can be measured.

This manual testing system is satisfactory for limited quantities of cores. However, automatic testing is essential in order to make the rate of testing compatible with the rate of automatic manufacture.

Accordingly, it is an object of this invention to provide apparatus adapted to test at a fast rate magnetic cores that are relatively small in size.

Another object of this invention is to provide novel apparatus for automatically testing magnetic cores and selecting cores having predetermined characteristics.

A further object of this invention is to provide an improved system for simply, rapidly and inexpensively testing a large number of small cores to determine their magnetic properties.

The threading of windings through cores of extremely small dimensions for purposes of testing or for assembly in a magnetic memory can be a tedious process. This is due to the small overall size of the cores, which makes general handling difficult, and due to the small diameter of the hole through the core, making it difficult to thread.

Accordingly, it is another object of this invention to provide apparatus for automatically handling magnetic cores of toroidal-like shape and small size.

Still another object of this invention is to provide simple apparatus for handling magnetic cores quickly and reliably whereby they may be threaded with a winding, tested, selected, and stacked for assembly purposes.

These and other objects of this invention are achieved by a testing system in which the magnetic cores to be tested are threaded on metallic pins. The pins project radially from a conductive rotating wheel. The wheel may be continuously rotated so that the pins move successively past a core-threading station, an electrical test station, and a selecting or sorting station. At the core-threading station, the cores are predeterminedly positioned on a slotted track. The end of a pin moves through the slot in the track, enters the central hole in a core, and picks it up. The pin and core then move through the test station where the pin and wheel are engaged by a set of fixed contacts which complete energizing current-pulse and voltage pickup circuits through the pin. A series of tests are performed while the core passes through the test station. With appropriate measuring circuits, a signal is produced or not accordingly as the core characteristics fall within given limits or not. If the core is acceptable, a first wiper arm at the sorting station is activated by the signal. The wiper arm is moved into the path of the core, and it is removed from the pin and passes on to be stacked. If the core does not meet the standards, the first wiper arm is not activated, and the pin and core are moved to a second, fixed wiper arm which removes any cores still remaining and directs them into a reject receptacle.

The invention, both as to its mode of operation and construction, may be understood from the following description when read together with the accompanying drawings in which.

Figures 1, 2, 3:
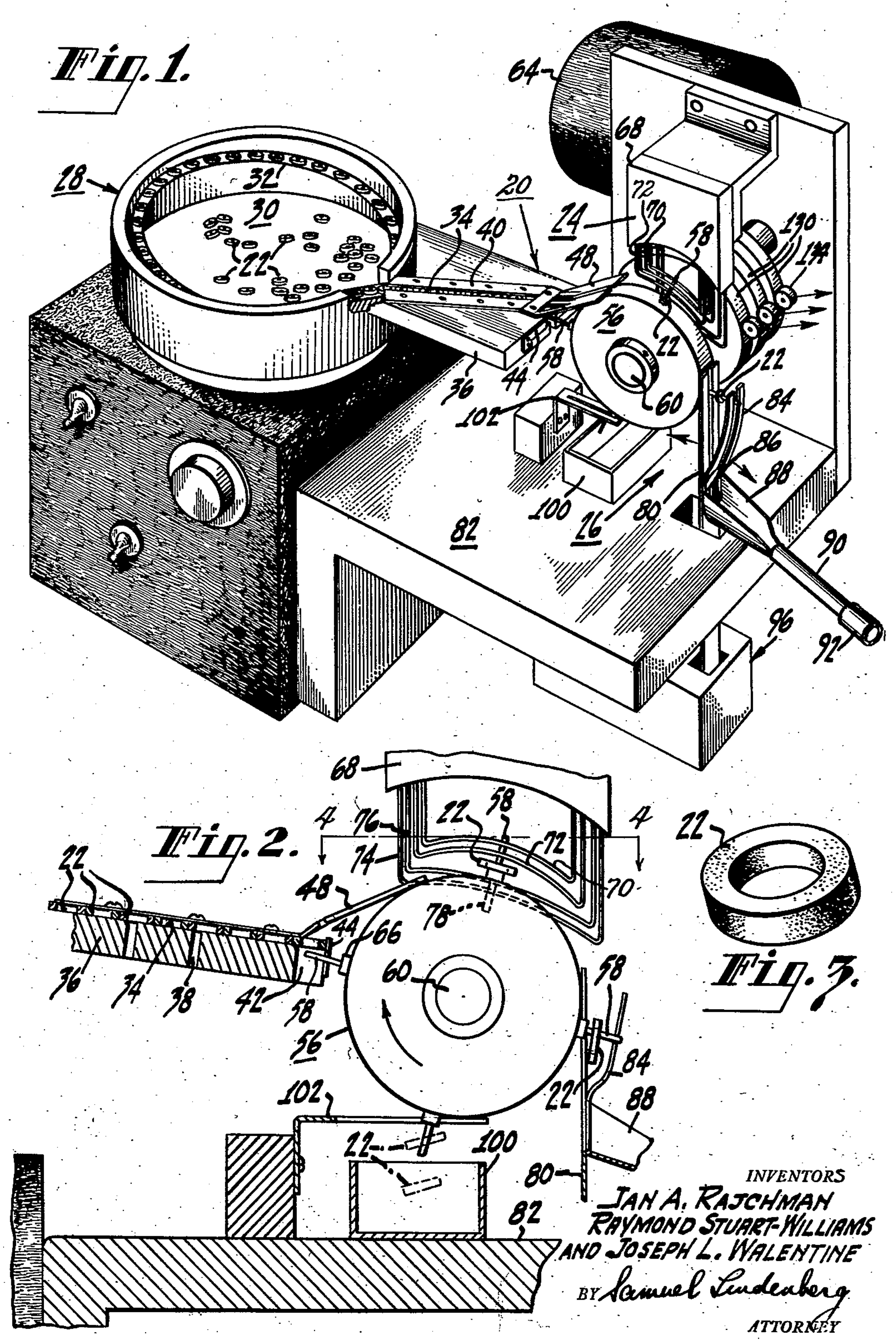
Figure 1 is a perspective view of apparatus embodying this invention.
Figure 2 is a side view partly in section of a portion of the apparatus.
Figure 3 is a perspective view of a toroidal-shaped magnetic core used with the apparatus.

Referring now to Figures 1–6 and especially to Figure 1, magnetic-core testing apparatus embodying this invention is shown in which there is provided a station 20 at which the magnetic cores 22 are threaded on a winding in the form of a pin, a test station 24 at which the electrical tests are performed, and a sorting station 26 at which the cores are sorted accordingly as they meet the standards of the test or not. The invention is shown as applied to the testing of toroidal-shaped cores (Figure 3). However, it is not limited in its application to circular-shaped cores, and apparatus embodying this invention may be used for testing any shape of core having a hole therethrough.

The magnetic cores 22 are fed to the core threading-station 20 by means of a parts elevator 28 of the vibratory conveyor type. This elevator is of well known construction and commercially available and has a dish 30 with an upwardly-running, helical conveyor surface 32 on its periphery, the width of which is about equal to the diameter of the cores. The helical surface 32 leads into a track 34 formed as a channel in a metallic plate 36, which is attached to the elevator 28 and inclined slightly downwards from the horizontal (Figure 2). The channel 34 is cut in the upper surface of the plate 36, and its width is slightly greater than the diameter of the cores. Holes 38 are bored through the plate 36 into the bottom of the channel 34 and serve to keep it clear of broken-core particles. A pair of cover plates 40 are fixed to the plate 36 and overlap the channel 34.

At the end of the track 34, there is a slot 42 cut through the bottom of the channel. The track channel 34 terminates against a flexible metallic strip 44, that is fixed to the edge of the track plate 36 and functions as a stop. There is a slot 46 through the stop 44, that is aligned with the slot 42 at the end of the track.

Figures 4, 5, 6:
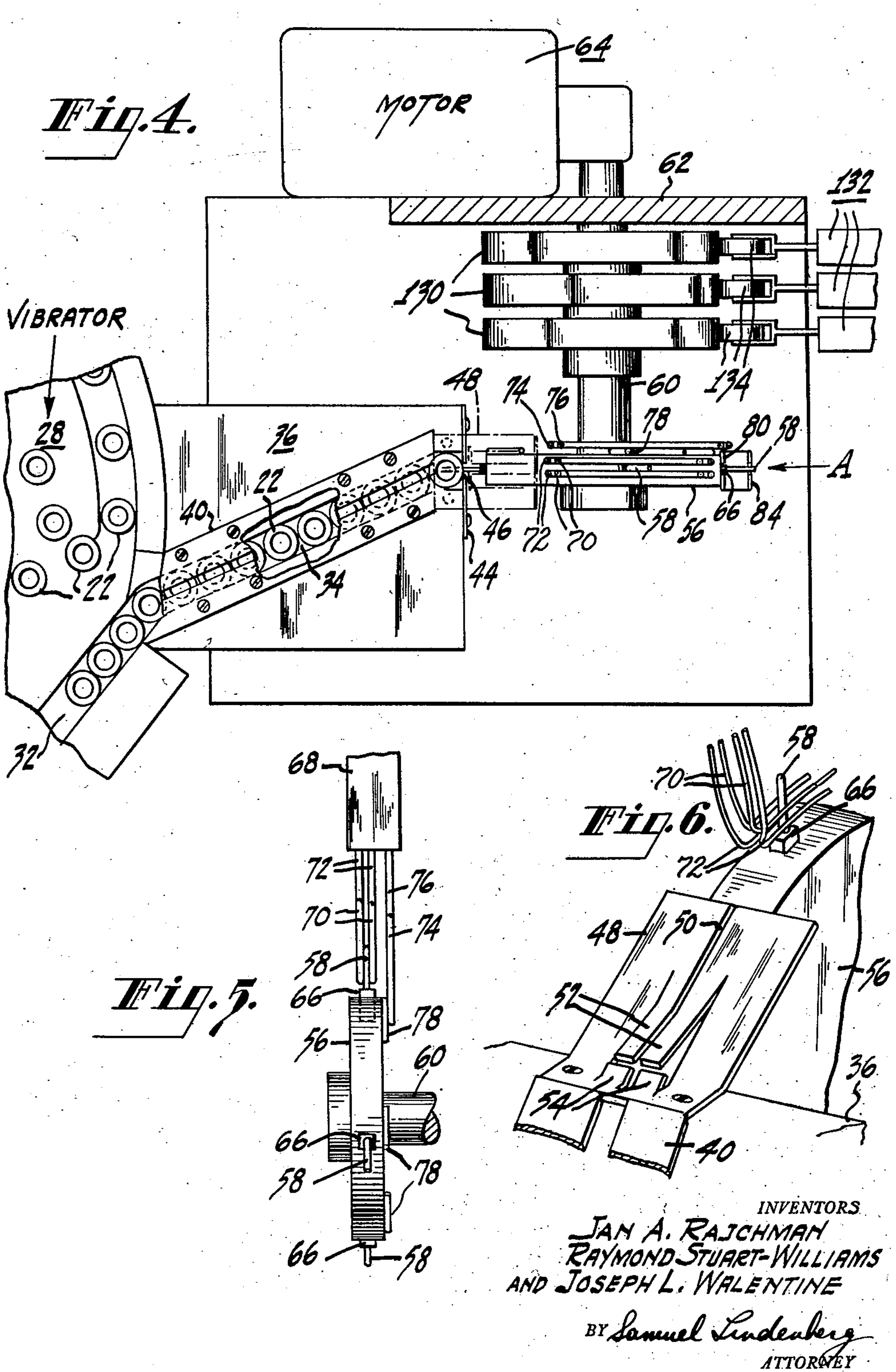
Figure 4 is a plan view taken on the line 4—4 of Figure 2.
Figure 5 is a detail of a portion of the apparatus as viewed along the general direction of arrow A in Figure 4.
Figure 6 is a detail of a portion of the apparatus in perspective.

A deflection leaf 48, formed as a bent sheet of spring metal, is attached at one end to the track plate 36, and its other end is free and inclined upwardly and away from the track. The deflection leaf 48 has a slot 50 extending most of its length which is aligned with the slots 46, 42 in the stop and track. Upper and lower tongues 52, 54 are cut out of an intermediate portion of the deflection plate leaf 48 and bent up at an angle to provide deflection surfaces (Figure 6).

A rotatable wheel 56 made of electrically-conductive material has fixed thereto a plurality of metallic non-magnetic pins 58. The pins 58 project radially from the periphery of the wheel 56 and are spaced equidistantly therearound. The wheel 56 is fixed to a shaft 60 which is journaled in a vertical frame member 62 and continuously driven by a motor 64. The shaft 60 and track plate 36 are positioned so that the pins 58 projecting from the wheel 56 are aligned with the slots 42, 46, 50 in the track, stop and deflection leaf and the ends of the pins pass through those slots upon rotation of the wheel. The free end of the deflection leaf 48 normally rests on the periphery of the wheel.

The threading of the magnetic cores 22 on the pins 58 is as follows: The cores are poured into the dish 30 of the elevator 28 which is vibrated vertically and angularly. The vibration causes the cores to move up the helical conveyor surface 32 in single file and to feed into the track 36. The vibration of the elevator 28 keeps the cores moving down the track 34 until the leading core rests against the stop 44 at the end of the track. At that point, the cores are in single file along the track, with their axes substantially vertical, and with the leading core predeterminedly positioned by the stop so that its axis is aligned with the slot 42 in the end of the track.

The track plate 36 and pins 58 are relatively positioned so that the arcuate path of the ends of the pins 58 passes through the central hole in the leading core positioned at the end of the track. Preferably, the ends of the pins reach slightly beyond the axis of the leading core and just clear the inner edge of the central hole in that core.

As the wheel 56 rotates, a pin 58 passes through the slot 42 in the end of the track, and when it makes an angle of about 25° with the horizontal, it engages the leading core. The end of the pin enters the hole in the core, and, at the same time, it tilts the core upwards so that it rests against the lower tongues 54 of the deflection leaf 48. The pin continues to rotate moving the core with it, with the upper tongues 52 pressing against the core and deflecting it onto the pin. The core is then fully threaded on the pin and it rests on a shoulder 66 at the base of the pin, which serves to maintain a clearance between the core and the periphery of the wheel.

The wheel 56 continues to rotate, moving the pin and core to the test station where the pin engages a plurality of electrical contacts that are attached to and dependent from a bracket 68 secured to the frame member 62. There are a pair of first current contacts 70 and a pair of first voltage contacts 72. Each pair of contacts engages the pin on opposite sides to avoid bending the pin. These contacts are in the form of metallic loops which have arcuate sliding contact portions concentric with the wheel 56. The voltage contacts 72 are larger loops so that they extend towards the wheel a slightly greater distance than the current contacts 70. A second current contact 74 and a second voltage contact 76 are also attached to the bracket 68, and are formed as metallic loops with arcuate sliding contact portions concentric with the wheel. The second current contact extends towards the center of the wheel a greater distance than the second voltage contact. Carried on one side of the wheel are a plurality of raised sliders 78, each of which is in radial alignment with a different one of the pins. When one of the pins 58 is engaged by the first contacts 70, 72, the associated raised slider 78 is engaged by the second contacts 74, 76.

When the pin is engaged by the first contacts 70, 72, an energizing-current circuit is completed through the first current contacts 70, the pin 58 carrying the core, a part of the wheel 56, the associated slider contact 78 on the wheel and the second current contact 74. This energizing circuit includes an electronic pulse generator for applying a series of current pulses to the pin. An appropriate pulse generator for this purpose is described below and in the patent application cited above.

A voltage pickup coil is also completed through the pin at the same time, and it includes the first voltage contacts 72, the pin 58, the wheel 56, the associated slider 78, and the second voltage contact 76. Voltages are induced in the pickup coil by the changes in magnetic flux in the test core that are produced by the energizing current pulses. These induced voltages are representative of the characteristics of the test core. The pickup coil is completed through the wheel and pin by the voltage contacts 72, 76 at points that are between the points of engagement of the current contacts 70, 74. Therefore, the relatively large and variable voltage drops due to current flow through the current sliding contacts are not added to the induced voltages. Thus, the voltage between the first and second voltage contacts 72, 76 is a true measure of the voltage induced by the test core. The voltage contacts are connected to electronic circuits, described below, which measure the induced voltages and determine whether the test core is acceptable or not.

The pin 58 and the raised slider 78 on the wheel 56 remain in engagement with the sliding contacts as the wheel rotates through an angle of the order of 60° to 90°. Consequently, the magnetic core remains at the testing station 24 for a sufficiently long period of time to be thoroughly tested. Illustratively, the time for passage through the test station may be of the order of .1 to 1 second. During that test period, repeated cycles of test current pulses energize the pin and also activate the measuring circuits. A test cycle of pulses may last 400 to 2,800 microseconds, so that, in the interval that the pin is carrying a core through the test station, 30 to 2,500 complete test cycles may occur.

The measuring circuitry determines whether the core characteristics fall within given limits, and furnishes a signal of acceptance or rejection used to control the sorting operation. When the pin moves out of engagement with the sliding contacts, it leaves the test station 24, and moves on to the sorting station 26 where the core is removed from the pin, and sorted into one of two groups depending upon whether it is acceptable or not.

At the sorting station 26, there is a pivoted wiper arm 80, the upper part of which extends upwardly through a hole in a base member 82, and has a bifurcated end adjacent the wheel 56. A bifurcated spring member 84 is attached at one end to the wiper arm 80 and has a free end separated from the free end of the wiper arm by a distance slightly less than the length of the pin 58. The slot at the lower end of the spring member 84 is enlarged to an opening 86 larger than the diameter of a core in order to pass cores therethrough. Attached to the wiper arm 80 just below this enlarged opening 86 is a chute 88 which carries a flexible tube 90 on its end (Figure 1). Carried on the end of the flexible tube is a tubular receptacle 92 with a small hole in its lower end, and of diameter slightly greater than that of the cores. The lower part of the wiper arm 80 is attached to one leg of a pivoted L-shaped bracket 94 (Figure 7), the other leg of which is actuated by a solenoid 96. A spring 98 attached between the lower part of the wiper arm 80 and the base member 82 biases the wiper arm to its normal, unactuated position away from the wheel and out of the path of the pins.

If the tested core is acceptable, the signal produced by the measuring circuits energizes the solenoid 96 to actuate the wiper arm 80. The bifurcated end of the arm 80 is moved into engagement with the periphery of the wheel 56 and tangential to it. The pin 58 moves through the slot in the wiper arm, and the core is deflected outwardly by the end of the arm. The slot in the spring member 84 receives the free end of the pin and prevents the escape of the core due to impact. The core is funneled down to the enlarged opening 86 in the spring member where it leaves the pin. At about that time, the solenoid 96 is de-energized and the wiper arm 80 swings back to its normal position under spring action. The core shoots through the enlarged opening 86 and down the chute 88 and flexible tube and into the receptacle 92.

If the core is a reject, the solenoid 96 is not energized by the measuring circuits, and the wiper arm 80 remains in its normal position out of the path of the pin. In that case, the pin continues to carry the core until it is in the lowermost position, at which point the core will tend to fall off the pin into a reject receptacle 100. To insure that the core is removed from the pin, a fixed bifurcated wiper arm 102 is positioned to engage the bottom of the periphery of the wheel. The fixed wiper arm 102 deflects any reject core still on the pin into the reject receptacle 100. The rotation of the pin continues, and it enters the core-threading station 20 to repeat the cycle.

The sorting of the cores may be into several categories rather than just the two of acceptable or rejected. To do this it is merely necessary to locate at the sorting station a plurality of solenoid-operated wiper arms at various angular positions around the wheel. The measuring circuits may be arranged to produce a plurality of different signals for different categories of core characteristics, and the appropriate one of the wiper arms is operated accordingly to remove the core. A final fixed wiper arm is then provided to remove cores that do not fall into any of these categories. Sorting into several categories may also be obtained with dual selection apparatus by passing the cores through several runs and changing the criterion of acceptance for each run.

The tested cores are usually used in devices such as memory arrays in which a plurality of cores are strung on a wire. The stacking of acceptable cores for stringing on a wire may be performed automatically with the apparatus shown. The tubular receptacle 92 (Figure 1), attached to the end of the flexible tube 90 carried, in turn, by the chute 88, performs this operation. The vibration of the wiper arm 80 due to the chattering of the solenoid 96 is communicated through the flexible tube 90 to the tubular receptacle 92. This receptacle stacks the cores neatly on top of each other so that it is easy to thread a wire through them.

Figure 7:
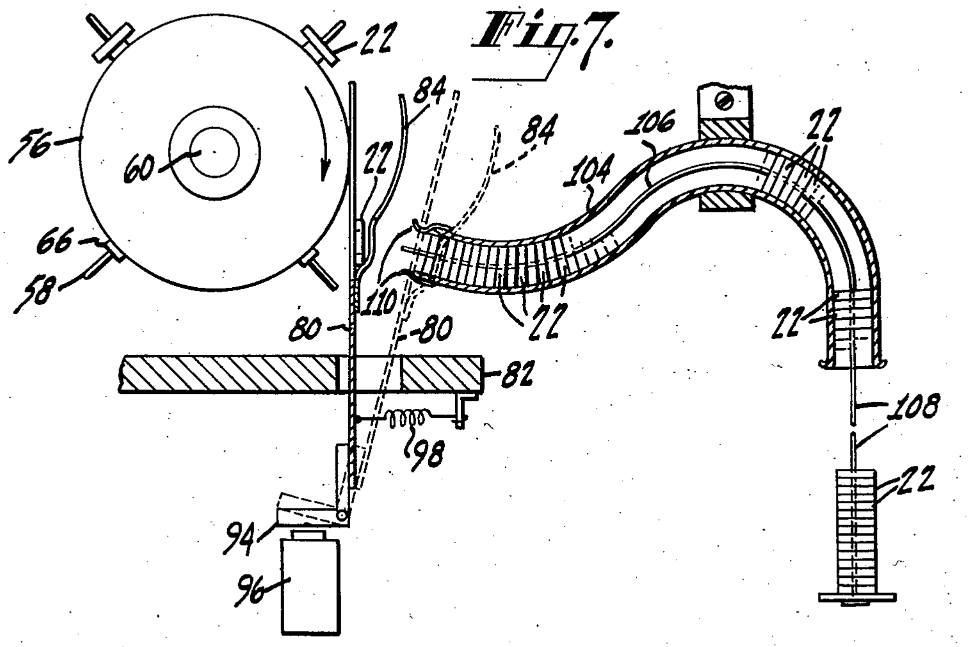
Figure 7 is a side view detail of a portion of the apparatus including an arrangement for stacking the cores.

An alternative method is shown in Figure 7. In this arrangement, a stiff tube 104 is provided and fixedly supported adjacent the upper part of the pivoted wiper arm 80. The stiff tube 104 has a bend in its central portion and a wire 106 threaded through the center of the tube. This wire 106 is stiff and held in the tube by means of a plurality of cores previously threaded on the wire. At one end of the stiff wire, there is secured a flexible wire 108 with a shoulder formed on its end which receives the cores and stacks them when they are forced out of the stiff tube. At the other end of the tube, a constriction is provided by a pair of spring-metal fingers 110 attached to the tube. This constriction holds the cores in the stiff tube and prevents their falling out. When the wiper arm removes an acceptable core from a pin, and is then returned to its normal position, the constricted end of the stiff tube 104 passes through the enlarged opening 86 at the bottom of the bifurcated spring member 84. The constricting fingers 110 on the tube 104 are forced open to receive the acceptable core and push it into the tube. Then, as the fingers 110 pass through the slot in the bifurcated wiper arm 80, they close and hold the core in the tube. The acceptable core is stacked neatly on the stiff wire 106 in the tube 104, and it pushes the stack of cores through the tube so that a core on the other end is pushed out and falls onto the flexible wire 108.

Figure 8:
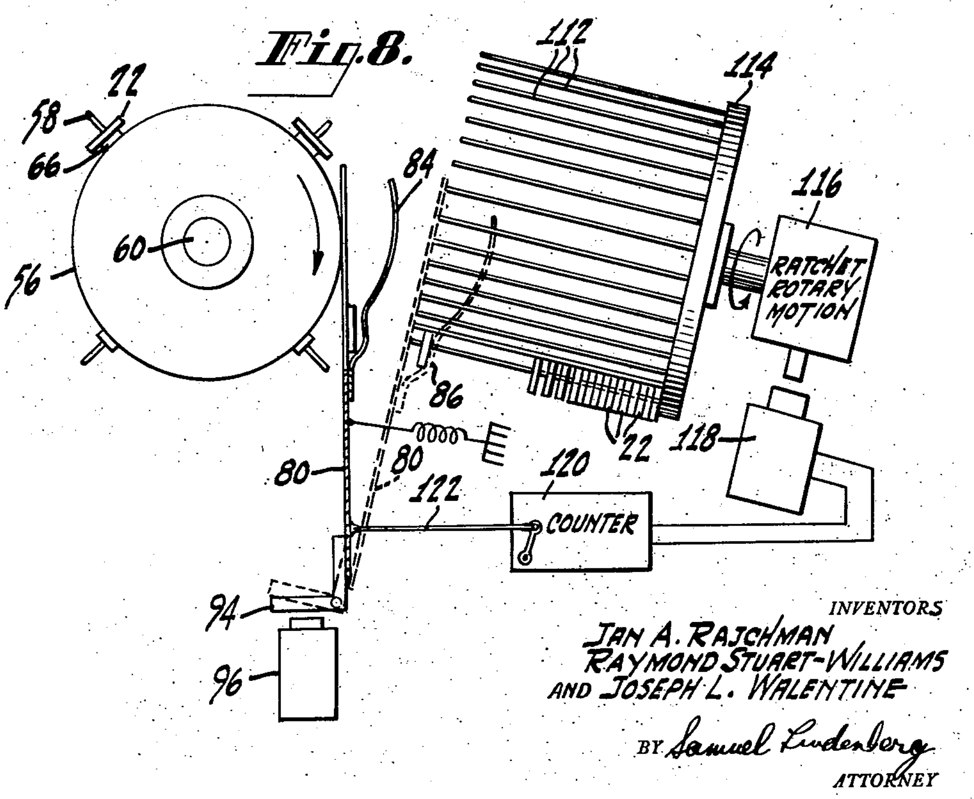
Figure 8 is a side view detail of another stacking arrangement.

Another method by which the acceptable cores may be neatly stacked on wires is shown in Figure 8. In this arrangement, a plurality of stiff straight wires 112 are fixed at one end around and perpendicular to the face of a rotatable circular disc 114. The disc may be rotated by a rotary motion device 116, such as a ratchet (not shown) actuated by a solenoid 118. The solenoid 118 in turn is connected to and energized by a counter 120. The counter 120 may be of any type, mechanical or electrical, and is stepped each time the wiper arm 80 is actuated. This may be done either by a slidable rod 122 in the path of the wiper arm 80, or by an electrical connection (not shown) to the circuit of the wiper-arm solenoid 96. The rotary disc 114 is supported at an angle to the vertical, approximately parallel to the wiper arm 80 when it is in its normal position. The lowermost one of the wires 112 enters the enlarged opening 86 in the bifurcated spring member 84 when the wiper arm 80 is returned to its normal position. In this way, the acceptable core, after it is removed, is thrown out of the wiper arm onto the wire 112. When the wire has received a predetermined number of cores, for which the counter 120 is set, the ratchet solenoid 118 is energized, and the ratchet turns the circular disc 114 to present the next wire to the pivoted wiper arm.

In order to synchronize the rotation of the core-supporting pin 58 through the test station 24 with the timing operations of the electronic circuitry used for testing, several cams 130 are fixed to the shaft 60 which drives the wheel 56 (Figures 1 and 4). These cams 130 actuate a plurality of microswitches 132 through cam-follower rollers 134. One of the microswitches 132 may be used to start and stop the pulse generator, described below, when the pin enters and leaves the testing station. Another switch serves to short out the voltage contacts 72, 76 when the pin is not in test position in order to protect the measuring circuits described below. Still another switch 132 may be used as a safety device to prevent operation of the wiper-arm solenoid 96 when the pin is in an angular position where it or the core might be damaged by being struck by the wiper arm 80. Another microswitch may be used to provide for manual push-button operation. This switch is actuated by a cam to stop the motor 64 upon operation of a push button switch and after the pin has reached a central test position. By means of this arrangement, the electronic circuitry may be checked with a standard core in the test position.

The automatic apparatus has been described thus far as operating with the wheel 56 continuously rotating, so that a core is tested while it is being moved through the test position. However, the apparatus embodying this invention is also adapted for intermittent operation. One of the microswitches 132 is arranged to be actuated by a cam 130 each time a pin is centrally positioned along the sliding contacts. Actuation of the switch results in rotation of the shaft 60 being stopped, and also in the starting of the pulse generator to perform the tests. After a predetermined time, when the tests are completed, the shaft is started again, and the tested core is carried to the sorting station. Automatic operation with the tests performed while the core is held stationary may be advantageous for more accurate testing. For example, it avoids the possibility, in continuous testing, of slight variations in the voltages received by the measuring circuit caused by small irregularities in sliding contact as the pin moves through the testing angle.

Figure 9:
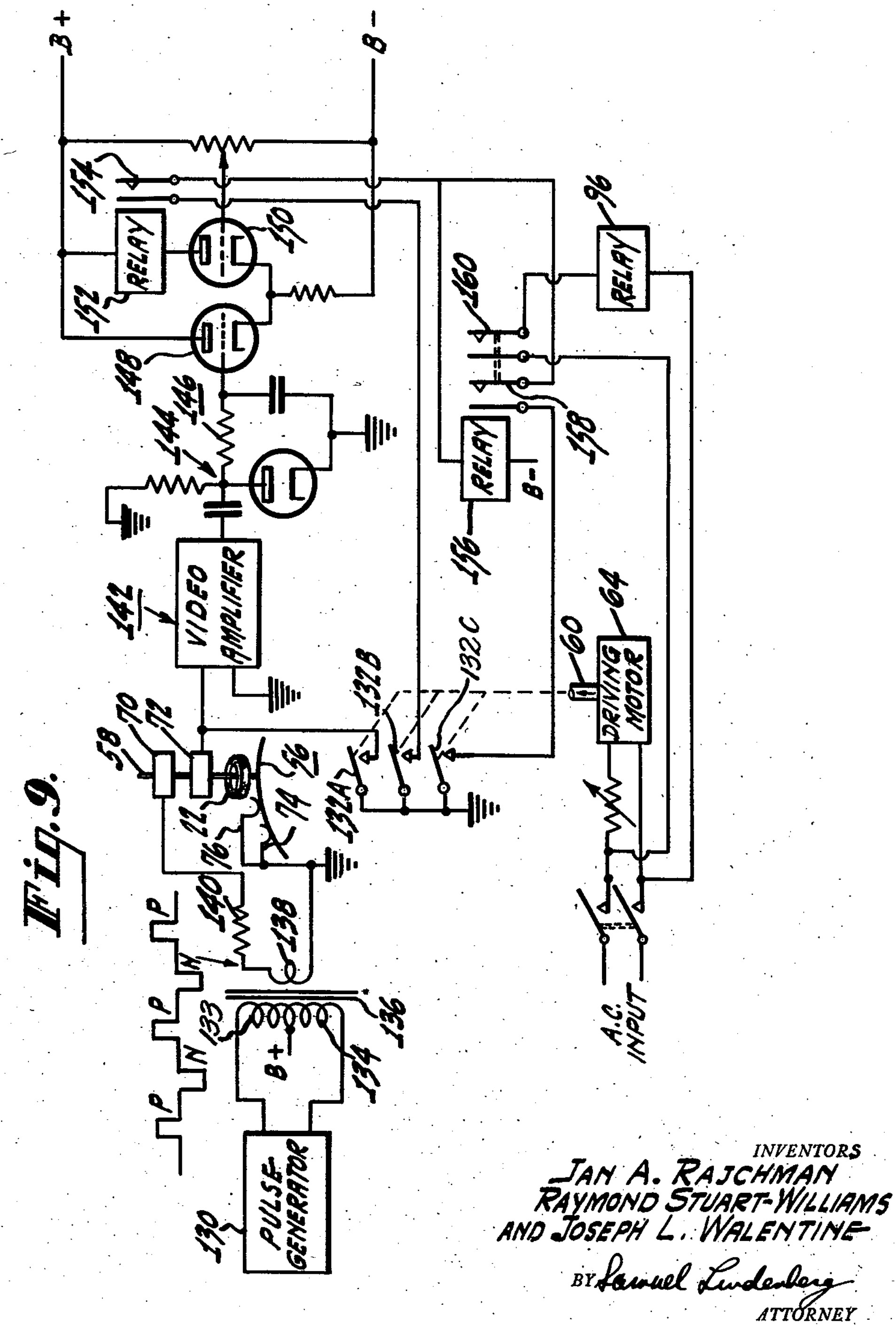
Figure 9 is a schematic and block diagram of circuits for testing the characteristics of magnetic cores.

A schematic diagram of simplified circuits for testing the characteristics of magnetic cores is shown in Figure 9. The circuit now described determines whether the peak voltage induced by the reversal of polarity of a test core is greater than a specified tolerance value or not, and thus, if acceptable or not. A program of positive and negative current pulses is applied to the test pin through the current contacts 70, 74 by means of a pulse generator of the type disclosed in the patent application cited above. As shown in detail in the aforementioned patent application, the pulse generator 130 is made up of the following circuits which are not shown in Figure 9 for simplicity of illustration. The pulse generator 130 includes freely running multivibrator which pulses a ring counter, the outputs of which are applied through buffers and a selector switch panel to different ones of a group of driver-gate circuits. The driver gates are keyed by a variable pulse-forming circuit which is also driven by the freely-running multivibrator. Each of the driver gates control a current amplifier which produce the outputs of the pulse generator 130.

The generator outputs are alternatively applied to the oppositely-wound primary windings 133, 134 of a driving transformer 136 which produce pulses of opposite polarity in the secondary winding 138. Typical waveforms in the secondary are shown above the transformer. The secondary 138 is connected in circuit with a current-regulating resistor 140, the current contacts 70, 74, and the test pin 58 and raised sliding contact 78 (Figure 5) when the latter enter the test station 24. The current pulses then flow through the test pin 58 alternately magnetizing the test core 22 to opposite polarities. The periods during which two pins are successively in and out of engagement with the sliding contacts to form two operating cycles are shown in line A of Figure 10.

The voltages developed across the test core 22 are detected between the voltage contacts 72, 76, the second one 76 of which is at ground. These signals are fed to the video amplifier 142 where they are amplified to a high level. An appropriate form of video amplifier is described in "Vacuum Tube Amplifiers," by Valley and Wallman, published by McGraw-Hill, at page 71 et seq. and shown on page 110. When the test pin is not in the contacts, there is a very large electrostatic coupling between the first voltage and current contacts 72, 70. Therefore, to prevent paralysis of the video amplifier 142, the first voltage contact 72 is shorted to ground through a first one 132A of the aforementioned cam-operated switches 132 during the period from just before the pin leaves the contacts until just after the next pin enters the contacts, as shown in line B of Figure 10.

The pulses occurring at the output of the amplifier are rectified by the rectifier circuit 144, to produce a negative potential at the anode of the rectifier tube. This signal is smoothed by a filter network 146, and applied to a voltage-discriminator circuit made up of a first and second electron tube 148, 150 having a common cathode resistor. The voltage at the grid of the second tube 150 is set by a potentiometer. The first tube 148 is normally conducting, and the negative rectified potential is applied to the control grid of this tube. With standby current flowing in the first tube, the cathode potential is at a relatively high voltage. Thus, at a predetermined setting of the potentiometer, the total grid bias on the second tube 150 is below cutoff potential. As the negative rectified potential increases in absolute magnitude, the cathode potential follows, decreasing until the total grid bias on the second tube 150 rises above cutoff. Then the second tube conducts, and the first tube is cutoff.

It is this switching of conduction from the first to the second tube which produces the signal that causes the selection solenoid 96 to be energized and the wiper arm 80 actuated. The setting of the potentiometer at the grid of the second tube determines the input potential that the discriminator is responsive to, and, thereby, determines the acceptance or rejection of the core. If the negative rectified potential is below a predetermined acceptable magnitude then the second tube does not conduct, and as a result the wiper arm 80 is not actuated.

The circuit controlling the actuation of the wiper arm is now described. When the second tube 150 conducts, a first relay 152 in the anode circuit of that tube is energized closing the relay contacts 154. These contacts are connected in series with a second cam-operated switch 132B. The second switch 132B is open for most of the cycle period, but closes for a short period towards the end of the motion of the test pin through the sliding contacts (line C of Figure 10). If the test core is acceptable so that the first relay 152 is energized, then at the end of the test period, a circuit is completed through the second switch 132B, the first relay contacts 154 and a second relay 156 energizing that relay 156. When the second relay 156 is energized, a holding circuit is completed through a first set of relay contacts 158 and a third cam-operated switch 132C that is closed at this time (line D of Figure 10). At the same time, a second set of relay contacts 160 closes, completing an energizing circuit from A.-C. supply through the selection solenoid 96, to actuate the wiper arm 80 to its core-removal position. This occurs just before the test pin leaves the sliding contacts.

Figure 10:
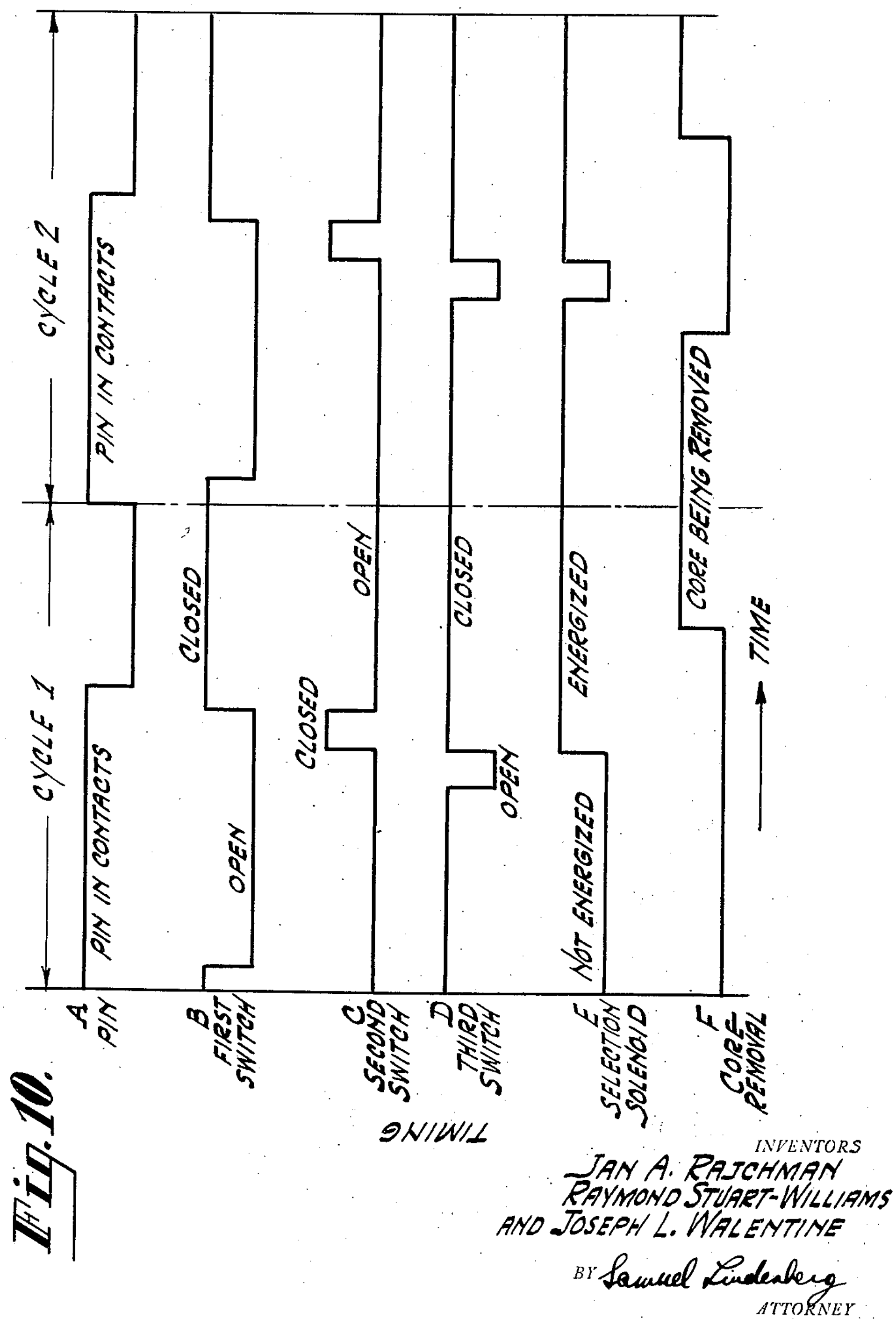
Figure 10 is a timing diagram of apparatus embodying this invention.

The selection solenoid 96 remains energized, and the wiper arm 80 remains in the actuated position, for the remainder of the first cycle and a portion of the second cycle (line E of Figure 10). The test pin passes through the wiper arm and the acceptable test core is removed during this period (line F of Figure 10). After a sufficient time for removal of the core, during which the next core is being tested, the third cam-operated switch 132C is opened momentarily, breaking the holding circuit for the second relay 156. The second switch 132B is open at this time so that the second relay 156 is deenergized, as is the selection solenoid 96. Therefore, the wiper arm returns to its unactuated position.

If the next test core is also acceptable, the first relay is energized again, as is the second relay during the period that the second switch is closed, and the cycle described above is repeated. This is shown in the second cycle of Figure 10. However, if the test core is a reject, the first relay is not energized. Consequently, the second relay and the selection solenoid are not energized, and the wiper arm remains in its unactuated position. This is the condition assumed for the cycle preceding the first cycle in Figure 10.

The time period for a cycle may be varied by varying the speed of the motor 64 and, thus, the speed of rotation of the wheel 56. The operation of the control circuitry is not affected by the speed of rotation since the switches 132 are actuated on a positional basis by the cams 130 fixed to the driving shaft 60. Thus, the control operations take place with the test pins in the same relative positions regardless of the speed of rotation.

The circuitry described is exemplary of the measurement of one of the characteristics of magnetic cores, that of the voltage induced by a reversal of polarity of a core, and of the sorting of cores accordingly as the amplitude of the induced voltage meets the standard set or not. Additional characteristics may also be measured with more elaborate circuitry. These characteristics may include the magnetic flux produced in the cores by the application of current pulses to the test pin, the time length of the voltage pulses induced by the cores, the effects on the magnetization of the cores of relatively small amplitude current pulses, and ratios of voltage amplitude or magnetic flux. Each of these characteristics may be determined from the voltages detected during the testing operations described above.

In summary, the testing apparatus embodying this invention described above may include various combinations of the following elements: Means for ordering the magnetic cores into a single file from a random pile, means for threading the cores one at a time on a rotatably mounted test pin, means for moving the pin through a test station where it engages a set of sliding contacts, electronic pulse circuitry for determining the acceptability of the cores according to variable criterions and for producing signals controlling the sorting of the cores, means for removing the cores from the test pin in response to those signals, and means for stacking the acceptable cores in an orderly fashion.

It may be seen from the above description of this invention that there is provided apparatus for automatically handling magnetic cores of small size that have a hole through them. The handling operations of threading the cores with a winding, moving them through a test station, sorting them, and stacking them are performed quickly and reliably. Thus, a large number of small magnetic cores may be rapidly and inexpensively tested to determine their magnetic properties.

What is claimed is:

1. Apparatus for testing the characteristics of magnetic cores comprising, in combination, means for positioning said cores at a predetermined location, a movable member, an electrically-conductive pin attached to said member and movable therewith, means movably supporting said member adjacent said positioning means with the path of movement of said pin passing through a core at said predetermined location, means for completing an electrical circuit through said pin including contact means for engaging said pin, electrical means coupled to said contact means for producing signals representative of the characteristics of a magnetic core on said pin, and means responsive to said signals for sorting the tested magnetic cores.

2. Apparatus for testing the characteristics of magnetic cores as recited in claim 1 wherein said means for positioning said cores includes a track having a slotted end portion, and a slotted stop at said end portion, said movable member is rotatably supported, and the arcuate path of movement of said pin passes through said slotted end portion and stop.

3. Apparatus for testing the characteristics of magnetic cores as recited in claim 2 wherein said movable member is of electrically-conducting material, said contact means includes a current sliding contact and a voltage sliding contact, and said means for completing an electrical circuit through said pin further includes another current sliding contact and another voltage sliding contact for engaging said movable member.

4. Apparatus for testing the characteristics of magnetic cores as recited in claim 3 wherein said means for sorting the tested magnetic cores includes a bifurcated wiper arm movably mounted for engagement with said movable member.

5. Apparatus for testing the characteristics of magnetic cores as recited in claim 1 wherein said movable member is of electrically-conducting material, said contact means includes a current sliding contact and a voltage sliding contact, and said means for completing an electrical circuit through said pin further includes another current sliding contact and another voltage sliding contact for engaging said movable member.

6. Apparatus for testing the characteristics of magnetic cores comprising, in combination, supporting means providing a core-threading station, a test station, and a sorting station, a movable member, an electrically-conductive, non-magnetic pin fixed to said movable member and projecting therefrom, means for feeding magnetic cores to be tested in single file to said core-threading station, means at said core-threading station for positioning said test cores for threading on said pin, electrical means for producing signals representative of the characteristics of a test core on said pin, contact means at said test station for coupling said electrical means to said pin, sorting means at said sorting station for removing magnetic cores from said pin responsive to said representative signals, and means for moving said movable member to move said pin sequentially through said core-threading station, said test station and said sorting station.

7. Apparatus for testing magnetic cores having a central hole therethrough comprising means for positioning said cores with the holes thereof in a first predetermined location and with the axis of the holes thereof in a predetermined orientation, a rotatable member, an electrically-conductive, non-magnetic pin attached at one end to said member and rotatable therewith, contact means for engaging the other end of said pin and for completing an electrical circuit through said pin at a second predetermined location, and means rotatably supporting said member adjacent said positioning means with the arcuate path of said pin passing through said predetermined locations whereby a core in said first predetermined location is threaded on said pin upon rotation of said member and said pin is moved to said second predetermined location.

8. Apparatus for handling magnetic cores as recited in claim 7 wherein said pin engages a core in said predetermined location with said pin intersecting the axis of said core.

9. Apparatus for handling magnetic cores as recited in claim 7 wherein said means for positioning said cores in a predetermined location includes a track for guiding said cores, and a stop at one end of said track.

10. Apparatus for handling magnetic cores as recited in claim 9 wherein said track has an opening at said one end thereof, said stop positions a core in said predetermined location with the hole thereof aligned with said opening, and the arcuate path of said pin passes through said opening.

11. Apparatus for handling magnetic cores having a hole therethrough comprising means for positioning said cores with the holes thereof in a first predetermined location and with the axes of the holes thereof in a predetermined orientation, a movable member, an electrically-conductive pin attached at one end to said member and movable therewith, contact means for engaging the other end of said pin and for completing an electrical circuit through said pin at a second predetermined location, and means for moving said member and said pin adjacent said positioning means in a direction transversely of the axis of said pin and with the path of movement of said pin passing through said predetermined locations.

12. Apparatus for handling magnetic cores having a hole therethrough comprising a track for guiding said cores, a stop at one end of said track for positioning said cores at said one end, means for feeding cores onto said track, a rotatable member, said track having a slot at said one end, a pin mounted on said member and rotatable therewith, means rotatably supporting said member adjacent said track with the arcuate path of said pin passing through a core positioned at said one end of said track and through said slot, said stop having a slot through which said arcuate path passes, and a deflection member mounted adjacent said one end of said track and adjacent said arcuate path for deflecting said cores to said pin, said deflection member having a slot through which said arcuate path passes, whereby an end core on said track is threaded on said pin upon rotation of said rotatable member.

13. Apparatus for handling magnetic cores as recited in claim 12 wherein said track guides said cores for movement in a substantially horizontal plane, said deflection member is mounted on top of said track and is inclined upwardly therefrom, said rotatable member is a wheel, and said pin projects radially from said wheel.

14. Apparatus for handling magnetic cores having a hole therethrough comprising in combination a track for guiding said cores, means for feeding said cores onto said track, means for positioning said cores at a predetermined location at one end of said track, a rotatable member, a pin mounted on said member and rotatable therewith, and means rotatably supporting said member adjacent said one end of said track with the arcuate path of said pin passing through said predetermined location so that said pin is adapted to be threaded through cores to be positioned thereat, and means for removing said cores from said pin including a wiper arm mounted adjacent said rotatable member, adjacent the arcuate path of said pin and tangentially to the arcuate path of a portion of said pin said wiper arm including a pair of diverging bifurcated members connected at one end, the other end of one of said members being contiguous to said rotatable member, the other of said bifurcated members having an enlarged opening between the bifurcations adjacent the one end thereof, and the arcuate path of said pins passing between the bifurcations of said wiper arm members.

15. Apparatus for handling magnetic cores having a hole therethrough comprising a rotatable member, a pin attached to said member and projecting therefrom, means for threading said cores on said pin, and means for removing said cores from said pin including a wiper arm having a pair of bifurcated members diverging upwardly, said arm being mounted adjacent said rotatable member with the arcuate path of said pin passing between the bifurcations of said wiper arm members and the upper end of one of said bifurcated members contiguous to said rotatable member, the other of said bifurcated members having an enlarged opening between the bifurcations adjacent the lower end thereof.

16. Apparatus for handling magnetic cores as recited in claim 15 wherein said wiper arm is pivotally mounted for movement towards and away from said rotatable member said means for removing cores from said pin further includes signal responsive means for pivoting said wiper arm, and means for stacking said cores.

17. Apparatus for handling magnetic cores as recited in claim 16 wherein said means for stacking said cores includes means for funneling said cores, one end of said funneling means being attached to said wiper arm adjacent said enlarged opening, and a tube having an internal diameter slightly larger than the external diameter of said cores connected to the other end of said funneling means.

18. Apparatus for handling magnetic cores as recited in claim 16 wherein said means for stacking said cores includes means for supporting a wire adjacent said enlarged wiper arm opening.

19. Apparatus for handling magnetic cores as recited in claim 18 wherein said means for supporting a wire includes a supporting member, means for rotating said supporting member, and a counter responsive to the operation of said means for pivoting said wiper arm for actuating said rotating means.

20. Apparatus for handling magnetic cores as recited in claim 18 wherein said means for stacking said cores includes a stiff tube mounted adjacent said wiper arm and having a bend in an intermediate portion, a constriction at one end of said tube adjacent said enlarged opening of said wiper arm, and a stiff wire mounted along the axis of said stiff tube.

21. Apparatus for testing the characteristics of magnetic cores comprising in combination, a movable member, an electrically-conductive pin attached at one end to said member and movable therewith, means for threading said cores on said pin, means for completing an electrical circuit through said pin including contact means for engaging said pin, means for moving said member to engage said pin with said contact means, and electrical means coupled to said contact means for producing signals representative of the characteristics of a magnetic core on said pin.

22. Apparatus for testing the characteristics of magnetic cores comprising in combination, an electrically-conductive wheel, a plurality of spaced electrically-conductive, non-magnetic pins projecting radially from said wheel, a plurality of spaced contact portions on said wheel each associated with one of said pins, means for threading said cores on said pins, first and second current contacts, first and second voltage contacts, means for rotating said wheel, means fixedly positioning said first and second contacts for respectively engaging said pins and contact portions upon rotation thereof, electrical means coupled to said contact means for producing signals representative of the characteristics of magnetic cores on said pins, and switch means actuated by said rotating means for controlling said signal producing means.

23. Apparatus for testing the characteristics of magnetic cores comprising a first set of electrical elements including an electrically-conductive pin on which the cores to be tested are to be mounted, and a contact device connected to one end of said pin; a second set of electrical elements including a first and second current contact, and a first and second voltage contact; means fixedly supporting one of said sets of electrical elements, and means movably supporting and positioning the other of said sets of electrical elements for respectively engaging said first contact elements with the other end of said pin and said second contact elements with said contact device, said voltage contact elements engaging said pin and contact device intermediate the points of engagement of said current contact elements, whereby a current path and a voltage pickup coil are respectively completed through said pin by said current and voltage contact elements.

24. Apparatus for testing the characteristics of magnetic cores as recited in claim 23 wherein said means for movably supporting and positioning the other of said sets of electrical elements includes an electrically-conductive rotatable member, and said pin and contact device are fixed to said rotatable member.

25. Apparatus for handling magnetic cores having a central hole therethrough comprising means for positioning said cores with the holes thereof in a predetermined location and with the axis of the holes thereof in a predetermined location, said positioning means including a track for guiding said cores and having a slot at one end thereof, and a stop at one end of said track for positioning cores in said predetermined location with the holes thereof aligned with said track slot, said stop having a slot aligned with said track slot, a wheel, a pin attached at one end to said wheel, rotatable therewith, and projecting radially therefrom, and means rotatably supporting said wheel adjacent said track with the arcuate path of said pin passing through said predetermined location and through said track slot and said stop slot, whereby a core in said predetermined location is threaded on said pin upon rotation of said wheel.

26. Apparatus for testing the characteristics of magnetic cores comprising in combination, a rotatable member, an electrically-conductive pin attached at one end portion to said member and rotatable therewith, means for positioning cores to be tested in the path of rotation of said pin, said pin being adapted to be linked to said cores to be tested, means for completing an electrical test circuit through said pin including contact means for engaging the other end portion of said pin, and means for cyclically rotating said member to engage said pin with said contact means.

27. Apparatus as recited in claim 26 and further comprising means for completing another electrical circuit through said pin including additional contact means for engaging said other end portion of said pin at the same time as said first-named contact means.

28. Apparatus for testing the characteristics of magnetic cores comprising in combination, a movable member, an electrically-conductive pin attached at one end to said member and movable therewith, means for positioning the cores to be tested in a location to be threaded by said pin, means for completing an electrical circuit through said pin including contact means for engaging said pin, means for moving said member to thread the cores to be tested by said pin and to engage said pin with said contact means, and electrical means coupled to said contact means for producing signals representative of the characteristics of a magnetic core threaded by said pin.

References Cited in the file of this patent

UNITED STATES PATENTS

| | | |
|---|---|---|
| 1,307,237 | Brown | June 17, 1919 |
| 1,416,585 | Stables | May 16, 1922 |
| 1,570,948 | Couch | Jan. 26, 1926 |
| 2,150,376 | Keating | Mar. 14, 1939 |
| 2,404,648 | Meyerhoff | July 23, 1946 |
| 2,534,753 | Bellow et al. | Dec. 19, 1950 |
| 2,566,767 | Hunt | Sept. 4, 1951 |
| 2,679,025 | Rajchman et al. | May 18, 1954 |
| 2,711,509 | Endres et al. | June 21, 1955 |
| 2,760,153 | Rajchman et al. | Aug. 21, 1956 |